United States Patent [19]

Naaktgeboren

[11] 4,403,544
[45] Sep. 13, 1983

[54] OVERLOAD PROTECTION DEVICE FOR BALER FEEDER MECHANISM

[75] Inventor: Adrianus Naaktgeboren, Zedelgem, Belgium

[73] Assignee: Sperry Corporation, New Holland, Pa.

[21] Appl. No.: 294,677

[22] Filed: Aug. 20, 1981

[30] Foreign Application Priority Data

Aug. 30, 1980 [GB] United Kingdom ................ 8028103

[51] Int. Cl.³ .............................................. B30B 1/00
[52] U.S. Cl. ................................... 100/189; 100/142; 56/341; 198/740
[58] Field of Search .................. 100/142, 189; 56/341, 56/342, 343, 344; 198/719, 740

[56] References Cited

U.S. PATENT DOCUMENTS

| 2,950,670 | 8/1960 | Nolt et al. | 100/142 |
| 3,127,830 | 4/1964 | McDuffie | 100/142 |
| 3,351,002 | 11/1967 | McDuffie | 100/189 |
| 3,367,094 | 2/1968 | Harwig | 56/364 |
| 3,570,395 | 3/1971 | Eberly | 100/189 |
| 4,011,710 | 3/1977 | Schmitt | 100/189 X |

FOREIGN PATENT DOCUMENTS 617955 2/1961 Italy .................................. 100/189
984043 2/1965 United Kingdom .

Primary Examiner—Peter Feldman
Attorney, Agent, or Firm—Darrell F. Marquette; Frank A. Seemar; Larry W. Miller

[57] ABSTRACT

A device for protecting a baler feeder mechanism against damage due to overloading. The device permits the otherwise stationary shaft to which the feeder elements are connected and rotatable about to move if the feeder mechanism becomes overloaded.

7 Claims, 13 Drawing Figures

OVERLOAD PROTECTION DEVICE FOR BALER FEEDER MECHANISM

BACKGROUND OF THE INVENTION

This invention relates generally to agricultural balers and to feeder mechanisms for such balers.

A conventional type of baler includes a bale case extending fore-and-aft in the direction of travel of the baler, a reciprocating plunger in the bale case, a feed table or platform extending laterally of the baler from the bale case, a pick-up mechanism in front of the feed platform, and feeder means above the feed platform. The pick-up mechanism lifts crop material from the ground and deposits it on the feed platform. The feeder means then conveys the crop material across the feed platform into the bale case where it is compressed into bales by the plunger.

If the feeder means becomes overloaded during operation such as by attempting to move an excessive amount of crop material, damage may occur to the feeder means and its drive means.

SUMMARY OF THE INVENTION

The present invention provides a baler including a bale case, a feed platform adjacent the bale case, and feed means for feeding crop material across the feed platform into the bale case. The feed means includes feeder elements which are connected to and rotatable about a generally stationary means. Resilient means urge the generally stationary means in one direction but permit movement of the generally stationary means in another direction if the feeder elements become overloaded. An indicator is connected to the generally stationary means to give an indication of the load on the feeder elements.

DETAILED DESCRIPTION OF THE PREFERRED EMBODIMENT

In the following description, right hand and left hand references are determined by standing at the rear of the baler and facing in the direction of forward travel. Also, in the following description, it is to be understood that such terms as "forward", "rearward", "left", "right", "upwardly", are words of convenience and are not to be construed as limiting terms.

Figure 1:
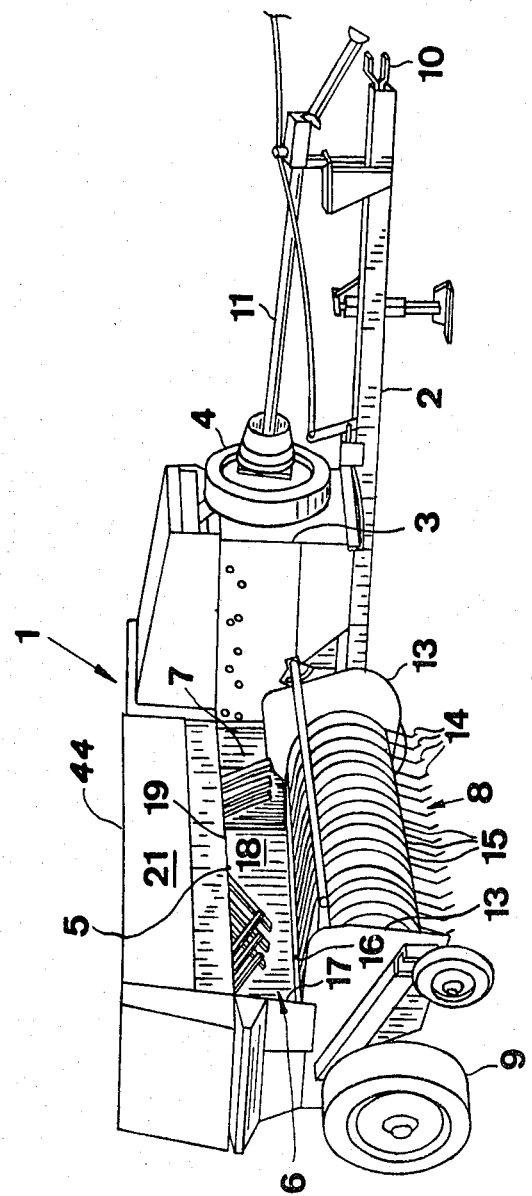
FIG. 1 is a perspective view of a baler embodying the present invention.

Referring now to FIG. 1, a baler is generally shown at 1 incorporating a preferred embodiment of the improved feed means, designated generally by reference numeral 6, of the present invention. The baler 1 includes a tongue 2 extending forwardly of the baler for attachment to a tractor (not shown), a fore-and-aft extending bale case or chamber 3 having a forward end on which a flywheel 4 is rotatably mounted, a feed housing or chamber 5 extending transversely of the baler and located adjacent the right hand side of the bale case 3 within which is mounted the feed means 6. The feed means 6 is adapted to convey crop material into the base case 3 through an inlet opening 7 therein, and a rotatable crop pick-up mechanism 8 mounted forwardly of and below the feed housing 5 is adapted to lift crop material from the field and deliver it to the feed means 6.

A plunger (not shown) is mounted for reciprocable movement in the bale case 3 for forming the crop material conveyed therein through the inlet opening 7 into rectangular bales. As a bale is formed in the bale case 3 it moves progressively towards the rear of the bale case 3 and when complete, it is banded with a suitable tying medium and subsequently emerges from the rear or discharge end of the bale case 3.

The baler is supported by a pair of ground engaging wheels 9 and, when articulately connected at a hitch end 10 of its tongue 2 to the drawbar of the tractor, it may be towed across a field. An input driveline 11 is connected at its rear end to the baler flywheel 4 and adapted for connection at its forward end to the power-take-off (pto) shaft (not shown) of the tractor for rotation in unison therewith to supply rotary driving power to the operating components of the baler 1.

The pick-up mechanism 8 comprises a reel (not shown) rotatable on a shaft, the axis of which is transverse to the longitudinal axis of the bale case 3. This shaft (not shown) is journalled in bearings carried on a pair of spaced side walls 13. The reel has a plurality of outwardly projecting tines 14 which project between a plurality of arcuate stripper plates 15.

Crop material elevated by the tines 14 is moved over the plates 15 and delivered rearwardly to a crop receiving feed platform 16 which extends transversely from the bale case 3 in a horizontal plane contiguous with the lower end of the inlet opening 7.

Disposed around the platform 16 is a housing having a side wall 17, a rear wall 18 and a slotted top wall 19. This housing forms the feed chamber 5 for the reception of the crop material from the pick-up mechanism 8. Mounted above the top wall 19 of the feed chamber 5 is another housing 44 comprising a front wall 21, a rear wall 22, side walls 23 and 24, a top wall 25 and an intermediate transverse wall 12. See FIGS. 2 and 5.

Figure 2:
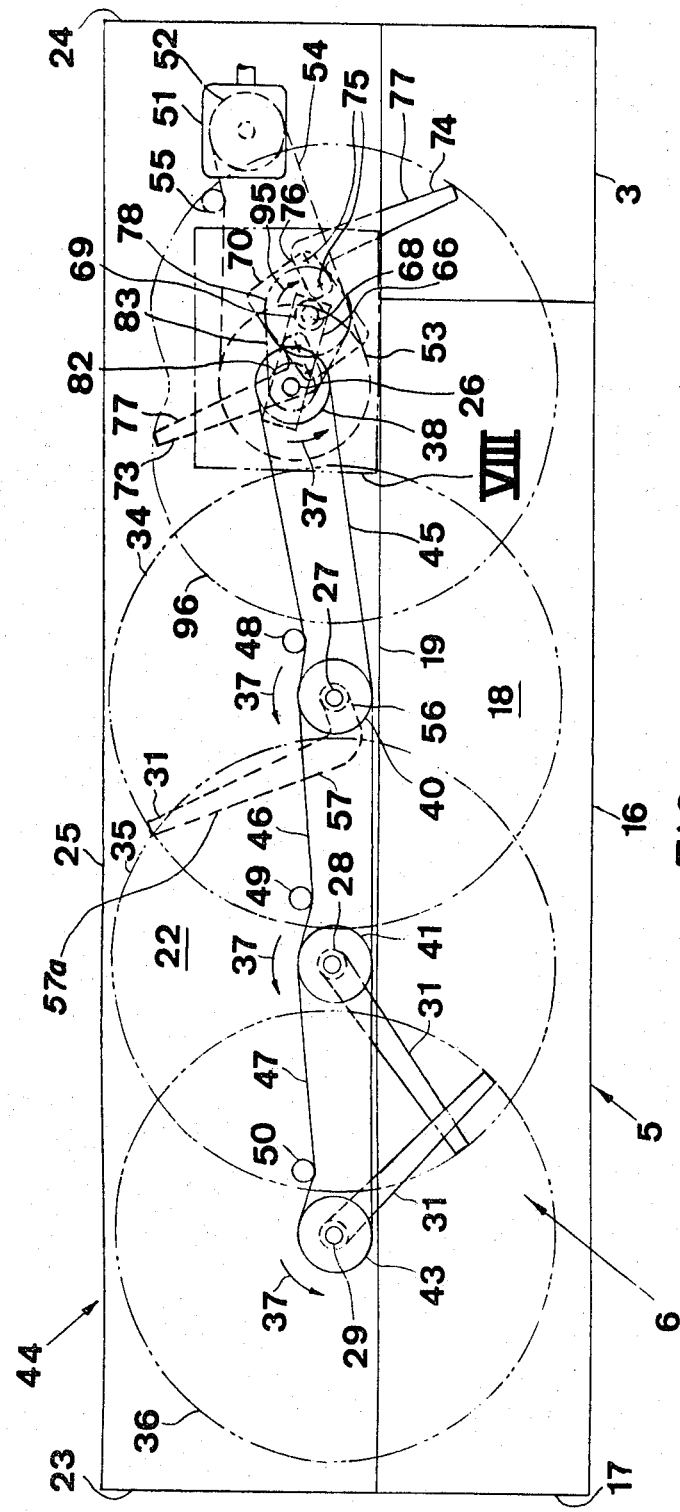
FIG. 2 is an enlarged schematic view taken in the fore-and-aft direction of the baler of FIG. 1 showing one embodiment of the feeder means according to the invention.

Transversely spaced apart shafts 26, 27, 28 and 29 are rotatably mounted on the intermediate wall 12 and the rear wall 22 adjacent the bottom of the housing 44. The axes of the shafts 26, 27, 28 and 29 are oriented generally in a fore-and-aft direction of the baler 1. A sprocket 38 is provided on the shaft 26, sprockets 39 and 40 are fixed on the shaft 27, sprockets 41 and 42 are fixed on the shaft 28, and a sprocket 43 is fixed on the shaft 29. Chains 45, 46 and 47 extend respectively around the sprockets 38 and 39, 40 and 41, and 42 and 43. Tensioning sprockets 48, 49 and 50 shown in FIG. 2 are provided to take up the slack in the chains 45, 46 and 47, respectively. Motive power is supplied from the input drive line 11 to an angle gearbox 51 mounted on the bale case 3. A sprocket 52 is provided on the gearbox 51, and a sprocket 53 is provided on the shaft 26. A chain 54 extends around the sprockets 52 and 53. A tensioning sprocket 55 shown in FIG. 2 takes up the slack in the chain 54. The sprockets 38, 39, 40, 41, 42, 43 are the same size so that the shafts 26, 27, 28, 29 will rotate at exactly the same speed. Furthermore, the shafts 26, 27, 28, 29 will rotate in the same direction which is indicated at 37 in FIGS. 2-4.

Each of the shafts 27, 28 and 29 carries a set of three parallel feeder tines 31, 32 and 33 spaced apart along the length of said shafts in the space between the intermediate wall 12 and the rear wall 22. The feeder tines 31, 32 and 33 on the shafts 28 and 29 extend radially therefrom. The feeder tines 31, 32 and 33 on the shaft 27 each have a radially extending arm section 56 mounted on the shaft 27 and a tine section 57 extending generally perpendicular to the arm section 56. Each tine section 57 has a leading edge 57a. In operation, each tine section 57 moves ahead of a straight line extending from the shaft 27 to the tip of the tine section 57.

Figure 3:
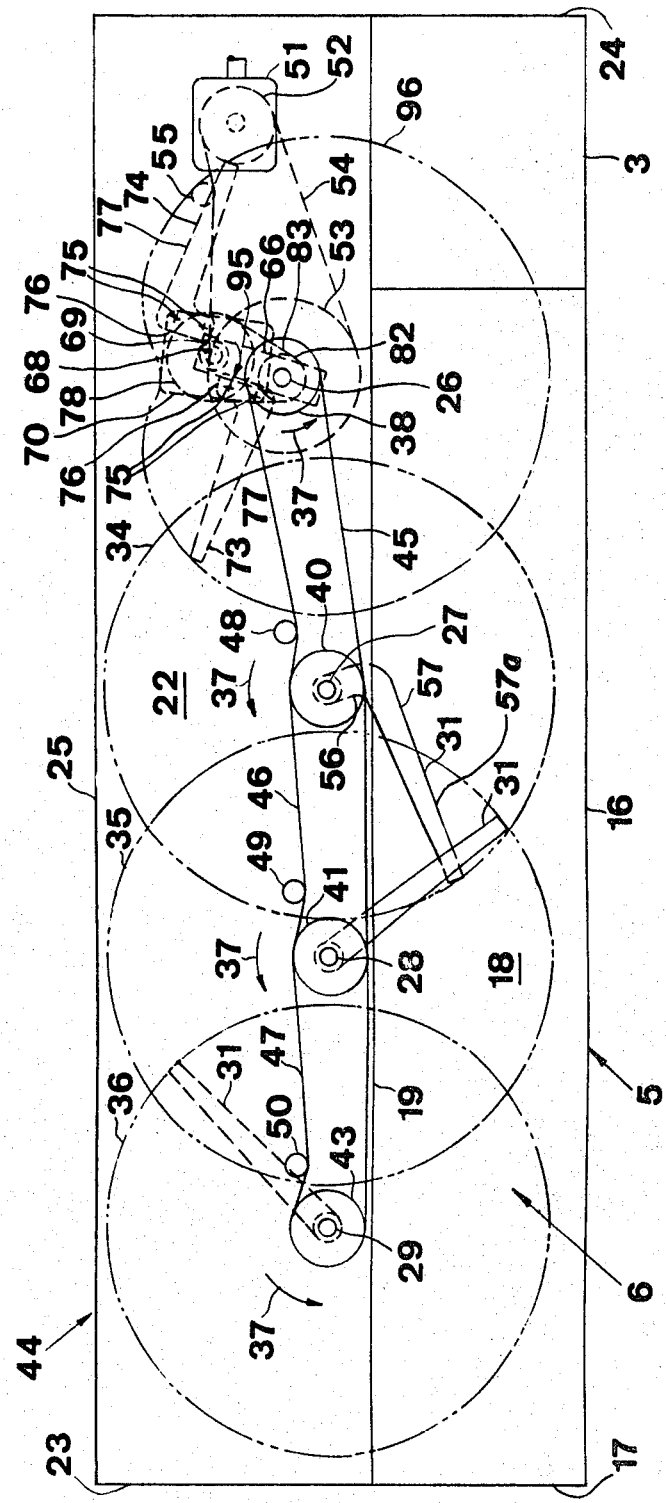
FIGS. 3 and 4 are views similar to FIG. 2 but with the components of the feeder means in different positions.
Figure 4:
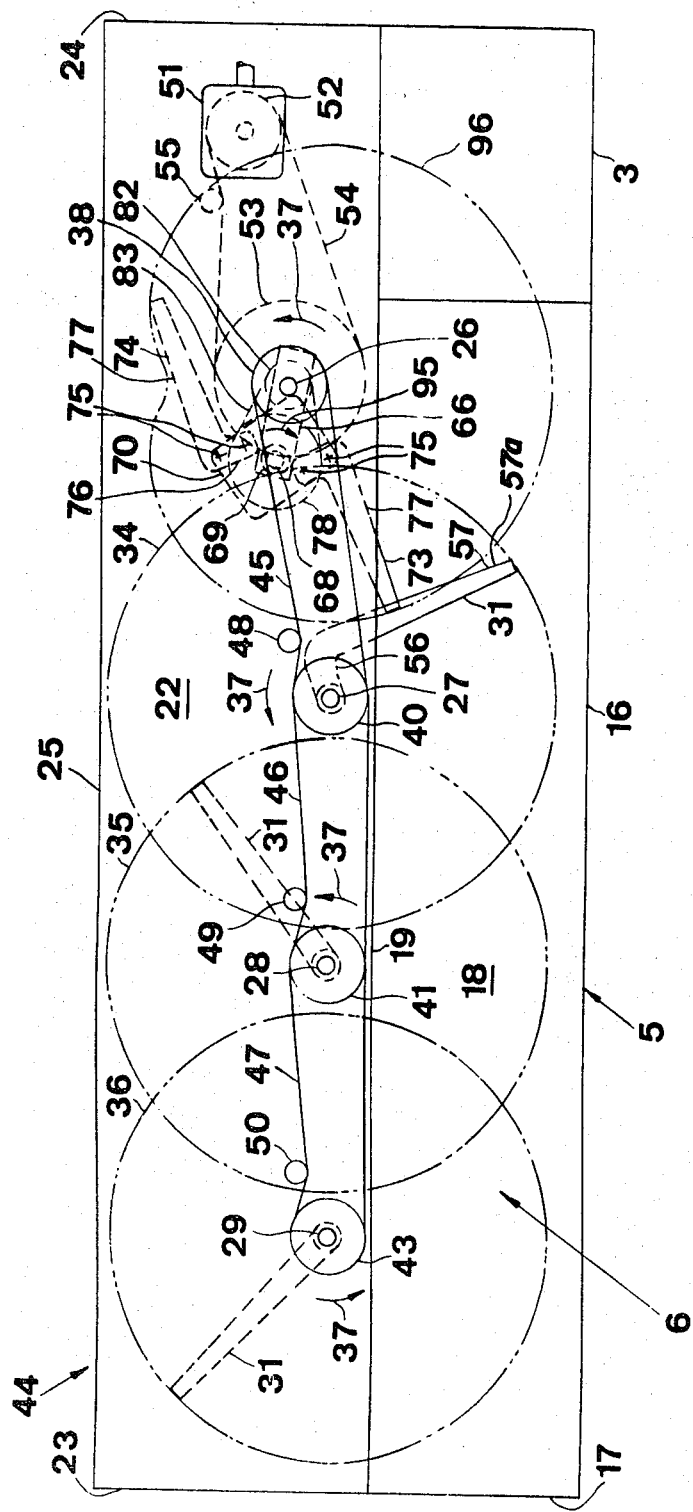

Referring to FIGS. 2-4 the paths of movement 34, 35 and 36 of the feeder tines mounted on the shafts 27, 28 and 29 overlap each other when seen in the axial direction of the shafts. The feeder tines 31, 32 and 33 of each set are disposed so that they pass closely alongside the corresponding feeder tines of the adjacent set or sets to provide a stripping or combing off action while avoiding any interference during operation. This is best seen in FIG. 5, wherein all the feeder tines on the shafts 27, 28, 29 are schematically shown in two opposite horizontal positions substantially 180° apart.

The paths of movement 34, 35 and 36 of the feeder tines mounted on the shafts 27, 28 and 29 fall fully within the space between the feed platform 16 and the top wall 25 of the housing 44, so that no components stick out of the machine shieldings during operation. Thus, a relatively low profile baler is obtained.

The lower sections of the paths of movement 34, 35 and 36 extend into the feed chamber 5 so that the feeder tines on the shafts 27, 28, 29 sweep across the feed chamber 5 in the direction towards the bale case 3. The various feeder tine sets are timed so that each set of feeder tines moves about 90° ahead of the next adjacent set of feeder tines closer to the bale case 3. The set of feeder tines on the shaft 29 enters the feed chamber 5, then sweeps through the feed chamber 5 in the direction toward the bale case 3 and then retracts from the feed chamber 5. Next, the set of feeder tines on the shaft 28 enters the feed chamber 5 and starts moving across the feed chamber 5 in the direction towards the bale case 3 while stripping or combing off the set of feeder tines on the shaft 29 as they retract from the feed chamber 5. Then the set of feeder tines on the shaft 28 sweeps through the feed chamber 5 in the direction toward the bale case 3 and retracts in an upward direction from the feed chamber 5. Next, the set of feeder tines on the shaft 27 combs off the set of feeder tines on the shaft 28 as they retract from the feed chamber 5, then sweeps through the feed chamber 5 in the direction toward the bale case 3, and then retracts from the feed chamber 5. Because the leading edge 57a of each feeder tine on the shaft 27 is inclined relative to the straight line extending from the axis of the shaft 27 through the tip of the feeder tine section 57, the feeder tines on the shaft 27 have an improved combing off action relative to the feeder tines on the shaft 28. The sets of feeder tines on the shafts 27, 28 and 29 thus comprise a first feeder mechanism for feeding crop material across the feed platform 16 toward the bale case 3.

Figure 5:
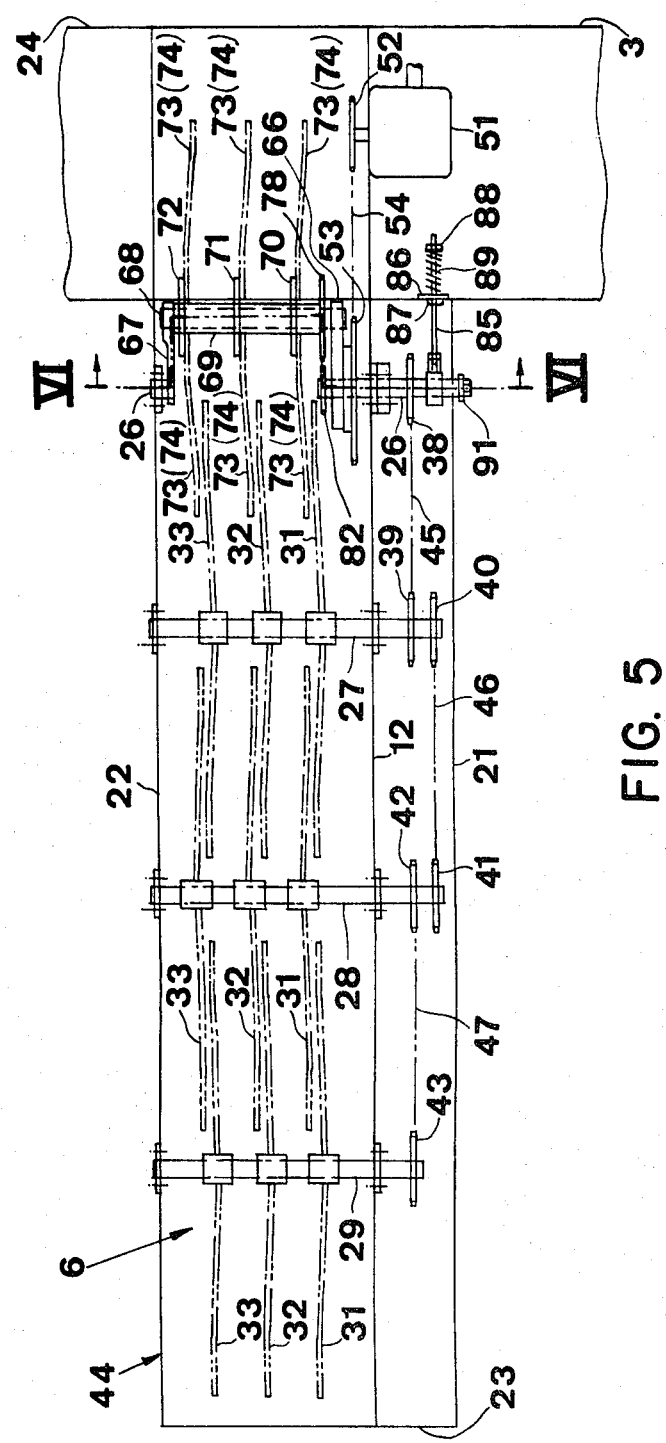
FIG. 5 is a schematic top view of the feeder means of FIGS. 2, 3 and 4.
Figure 6:
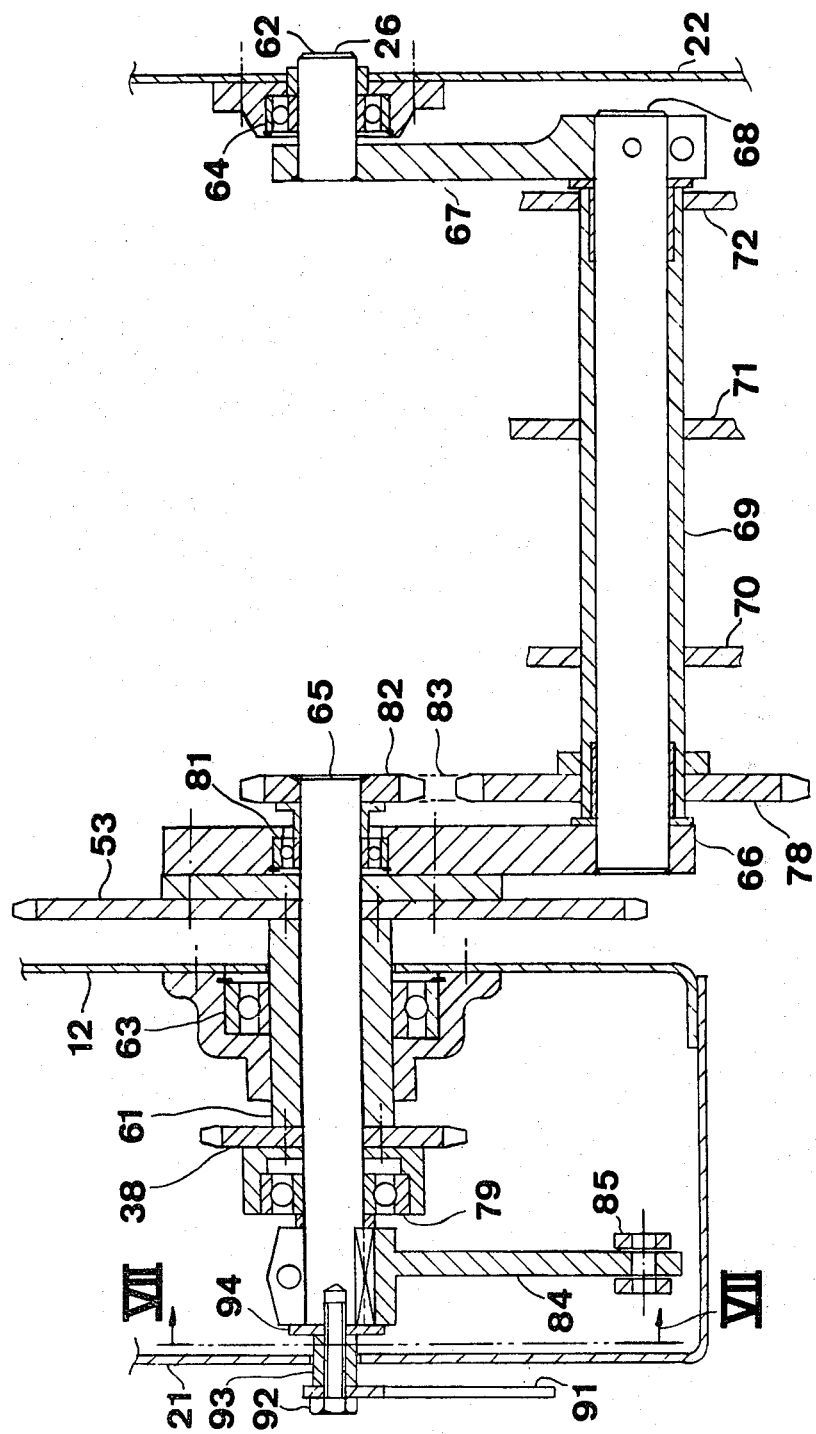
FIG. 6 is an enlarged sectional view taken along line VI—VI in FIG. 5.
Figure 8:
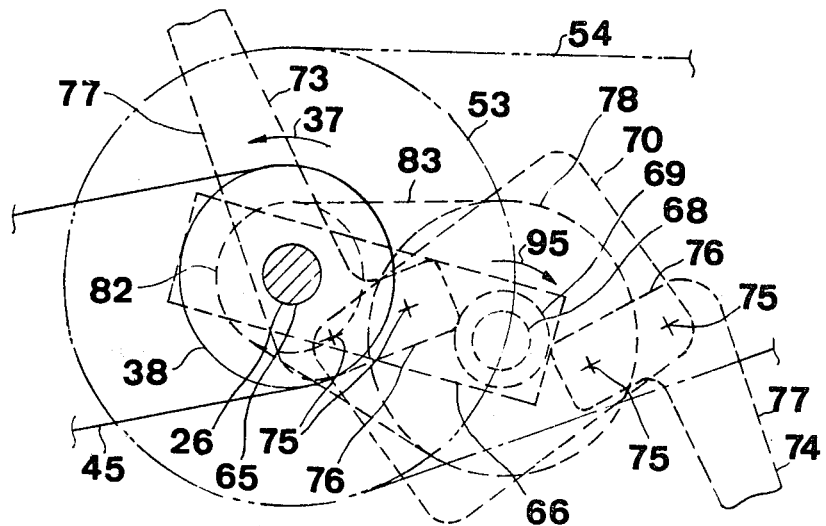
FIG. 8 is an enlarged schematic view of the components of the feeder means indicated at VIII in FIG. 2.

As best seen in FIGS. 5 and 6, the shaft 26 comprises a pair of spaced apart stub shafts 61 and 62. Stub shaft 61 is rotatably mounted via bearing 63 on the intermediate wall 12, and stub shaft 62 is rotatably mounted via bearing 64 on the rear wall 22. Stub shaft 61 is hollow and rotatably houses a further stub shaft 65. The stub shafts 61 and 62 carry at their facing ends parallel cranks 66 and 67, respectively, which are coupled to each other at their free ends by a further shaft 68. A bushing 69 is freely rotatably mounted on the shaft 68 and carries at spaced intervals along its length three identical feeder tine supports 70, 71 and 72.

Feeder elements in the form of a pair of generally opposite feeder tines 73 and 74 are attached to each of the supports 70, 71 and 72 via bolts and nuts 75 as shown in FIG. 2. The feeder tines 73, 74 may be attached to the supports 70, 71 and 72 in a number of positions so as to provide adjustment possibilities. At least in one position, the feeder tines 73, 74 are attached to the supports 70, 71, 72 diametrically opposite to each other and relative to the shaft 68 in a manner so that each of the feeder tines 73, 74 moves ahead of a straight line extending from the shaft 68 through the tip of the feeder tine. The feeder tines 73, 74 each comprise a mounting section 76 which is angled at substantially 90° relative to a tine section 77. Adjacent the stub shaft 65, a sprocket 78 is affixed to the bushing 69 whereby the sprocket 78 and the bushing 69 can rotate in unison on the shaft 68.

Figure 7:
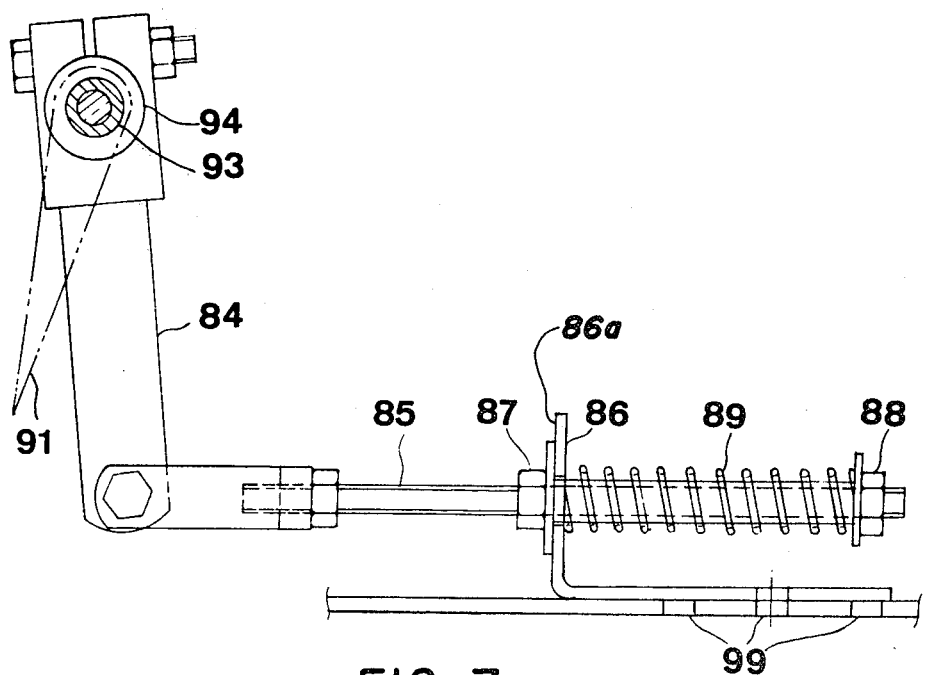
FIG. 7 is a partial sectional view taken along lines VII—VII in FIG. 6.

The stub shaft 65 is mounted coaxially within the hollow stub shaft 61 via bearings 79 and 81 and has its opposite ends extending beyond the opposite ends of the stub shaft 61. A sprocket 82 is keyed on one end of the stub shaft 65 in the plane of the sprocket 78. A chain 83 extends around both sprockets 78 and 82. Sprocket 78 has twice as many teeth as sprocket 82. An arm 84 is keyed on the other end of the stub shaft 65 and is pivotally coupled at its free end to a rod 85 which extends through an aperture in a support bracket 86 mounted on the baler frame. A pair of stops 87 and 88 are adjustably provided on the rod 85 adjacent the opposite ends of the support bracket 86. As seen in FIG. 7, stop 87 abuts against the portion 86a of the support bracket 86 which faces toward the feed chamber 5. A coil spring 89 is arranged coaxially with the rod 85 between the support bracket portion 86a and the stop 88. Stub shaft 65 is thus generally stationary except for rather limited angular displacement which is permitted by the coil spring 89. An indicator arm 91 is firmly secured to the same end of the stub shaft 65 as the arm 84 and is movable in unison with the stub shaft 65 in front of a scale (not shown) provided on the front wall 21 of the housing 44. As seen in FIG. 6, the indicator arm 91 is secured to stub shaft 65 by a bolt 92 which extends through an aperture in the front wall 21 and which is screwed into the end of the stub shaft 65. A spacer ring 93 is provided between the indicator arm 91 and a washer 94 abutting against the end of the stub shaft 65 and the arm 84. The spacer ring 93 projects through the aperture in the front wall 21.

The drive sprocket 53 is firmly secured to the hollow stub shaft 61 at one end thereof and receives motive power from the angled gearbox 51 via the chain 54. The sprocket 38 is firmly attached to the other end of the hollow stub shaft 61.

When driven, the cranks 66 and 67 together with the shaft 68 are rotated in the direction 37 around the axis of the hollow stub shaft 61 thus entraining with them the bushing 69 with the feeder tines 73 and 74 thereon. The coil spring 89 urges the stop 87 in abutment with the support bracket 86 so that the stub shaft 65 and the attached sprocket 82 are held stationary. As the bushing 69 and the attached sprocket 78 are caused to rotate around the "stationary" sprocket 82, the chain 83 which is wrapped around both sprockets 78 and 82 is caused to roll around the "stationary" sprocket 82 in the same direction 37. As a consequence, the sprocket 78 and the bushing 69 with the feeder tines 73, 74 thereon are caused to rotate in an opposite direction 95 around the shaft 68. Since the sprocket 78 has twice as many teeth as the "stationary" sprocket 82, the bushing 69 is caused to rotate about the shaft 68 at half the speed of rotation of the bushing 69 around the shaft 65. This means that when the bushing 69 and cranks 66, 67 make a 360° cycle around the shaft 65 in the direction 37, the bushing 69 and the feeder tines 73, 74 rotate only over 180° in the opposite direction 95 around the shaft 68. Thus, the outer ends of the feeder tines 73, 74 make a resultant movement in the direction 37 along a path 96 of a particular shape.

Since the shafts 27, 28, 29 are rotated at the same speed as the cranks 66 and 67, the feeder tines 31, 32 and 33 on the shaft 27 are rotated twice as fast as the pairs of feeder tines 73, 74. In other words, the feeder tines 31, 32 and 33 on the shaft 27 alternatively cooperate with the feeder tines 73, and then with the feeder tines 74. The movements of the feeder tines 73, 74 and the set of feeder tines 31, 32 and 33 on the shaft 27 are timed with respect to each other so that, as the feeder tines 31, 32 and 33 retract in an upward direction from the feed chamber 5, either the feeder tines 73 or the feeder tines 74 enter the feed chamber 5 to comb off the feeder tines 31, 32 and 33 on the shaft 27. In order to provide this combing off action, the pairs of feeder tines 73, 74 and the feeder tines 31, 32 and 33 on the shaft 27 are disposed so that they pass closely alongside each other, but with sufficient clearance therebetween to avoid collision. As seen in FIGS. 2, 3 and 4, the paths 96 and 34 of the feeder tines 73, 74 and the feeder tines 31, 32 and 33 on the shaft 27 overlap each other.

The path of movement 96 of the feeder tines 73, 74 is apple shaped, as seen in FIGS. 2, 3 and 4. This path 96 remains fully within the space between the top housing wall 25 and the feed platform 16 thus assuring a baler of relatively low profile. The lower part of the path 96 is nearly circular in shape, whereby the feeder tines 73, 74 sweep across a predetermined portion of the feed chamber 5 and the bale case 3.

Figure 9:
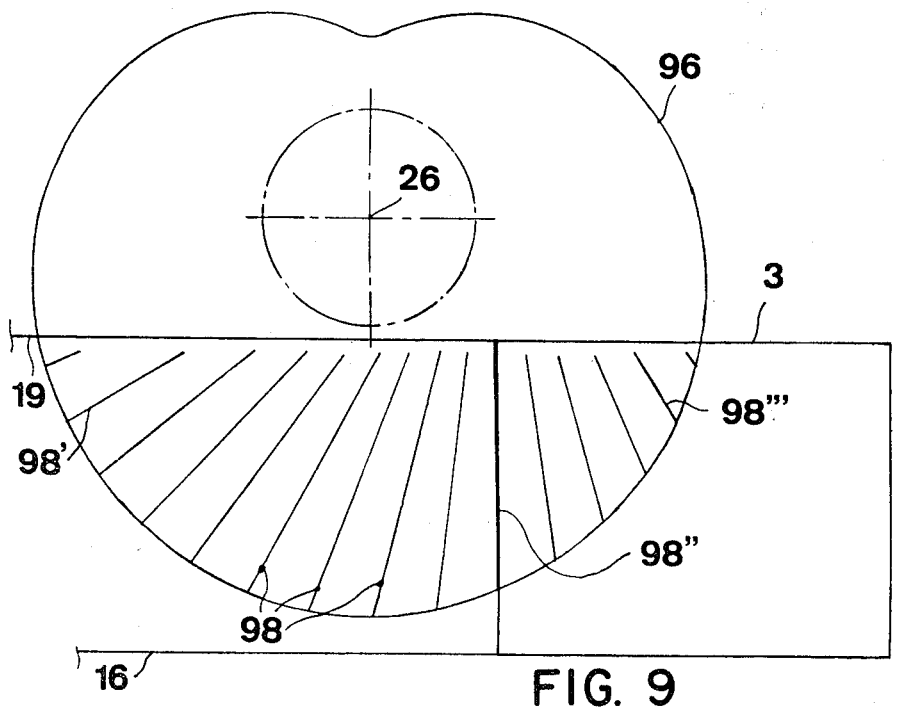
FIG. 9 is a schematic view illustrating the path of movement of certain components of the feeder means shown in FIG. 2.

FIG. 9 schematically shows the path of movement 96 of the feeder tines 73, 74, in relation to the bale case 3, and the orientation of the leading edges 98 of the feeder tines 73, 74, in a plurality of rotational positions within the feed chamber 5 and the bale case 3. The feeder tines 73, 74 are oriented at 98' at a rather small angle relative to the horizontal as they enter the feed chamber 5. This is advantageous because such an orientation permits the feeder tines 73, 74 to more fluently and better comb off the feeder tines 31, 32 and 33 on the shaft 27. As the feeder tines 73, 74 move through the feed chamber 5 in the direction toward the bale case 3, they progressively tilt further to ultimately assume a substantially vertical position 98" at the point where they enter the bale case 3 through the inlet opening 7. Thus, at this point in their cycle the feeder tines 73, 74 have a very positive grasp on the crop material.

The feeder tines 73, 74 sweep through a corner portion of the bale case 3 which is about one-third to one fourth the total bale case cross section. The feeder tines 73, 74 retract from the bale case 3 through a slot (not shown) in the top wall thereof. The feeder tines 73, 74 retract from the bale case 3 in an orientation 98''' at a rather steep angle relative to the horizontal. This permits the feeder tines 73, 74 to fluently and smoothly release the crop material after it has been fed into the bale case 3. Because of this particular orientation 98''', the feeder tines 73, 74 have only a minimal tendency or even no tendency at all for pulling crop through the slot in the bale case top wall. As a result thereof, there is no longer a need for providing stripper members on the bale case top wall for combing crop material off the feed fingers 73, 74 as they retract from the bale case 3. Thus, an even loading of the bale case 3 is obtained with this particular path of movement 96 of the feeder tines 73, 74.

The pairs of feeder tines 73, 74 thus comprise a second feeder mechanism for feeding crop material from the feed platform 16 into the bale case 3.

Assuming the feeder tines 73, 74 meet an increased resistance tending to prevent them from fully penetrating the bale case 3, a force will be transmitted back through sprockets 78, 82 and chain 83 to the shaft 65, which as a result thereof will be angularly displaced over a predetermined angle in the direction opposite to the direction of rotation 37 thus compressing the coil spring 89. Therefore, the coil spring 89 will exert an increased force on the arm 84, and a new equilibrium will be established between the loading on the feeder tines 73, 74 and the spring force. As a consequence thereof, the feeder tines 73, 74 will penetrate somewhat less deeply into the bale case 3. Thus, the spring 89 protects the second feeder mechanism against overloading.

This limited pivotal movement of the "stationary" shaft 65 reduces the peak loads in the feeder means 6 resulting from overloading. Also, this device helps in regulating the density of the crop material in the bale case 3 prior to the compression stroke of the plunger and in obtaining an even filling of the entire bale case 3. Furthermore, the angular displacement of the shaft 65 causes the indicator arm 91 to be angularly displaced to give an indication of the load on the feed fingers 73, 74 and thus an indication of the capacity at which the baler is operating. The operator thus can assess the capacity at which the baler is operating from the angular displacement of the indicator arm 91. That is, he can see whether the baler is operating at maximum capacity, below its maximum capacity, or is being overloaded.

Figure 10:
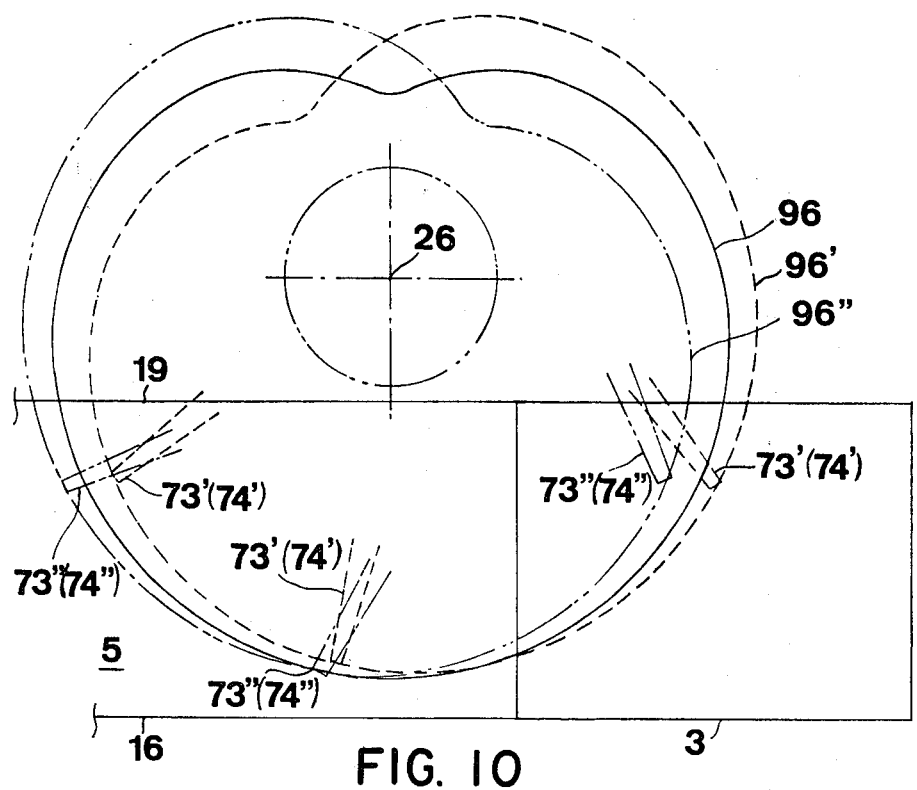
FIG. 10 is a view similar to FIG. 9 but showing different paths of movement of the certain components of the feeder means.

Referring to FIG. 7, the support bracket 86 may be adjustably mounted in any of several positions 99 on the baler frame. This adjustable mounting of the support bracket 86 varies the angular position of the apple shaped path 96, as shown in FIG. 10. Three alternative positions have been shown in FIG. 10 in full lines 96, dashed lines 96' and chain lines 96''. Thereby, the depth of penetration of the feeder tines 73, 74 into the bale case 3 and also the inclination of the feeder tines 73, 74 at the point of retraction from the bale case 3 may be varied. The orientation of the feeder tines 73, 74 is schematically shown at three points in each of the paths of movement 96' and 96". In the path 96', the depth of penetration of the feeder tines 73, 74 into the bale case 3 is increased, and the feeder tines 73, 74 are inclined at a greater angle relative to the vertical at the point of retraction from the bale case 3. With the feeder tines 73, 74 penetrating deeper into the bale case 3 and assuming an increased angle of inclination relative to the vertical, more crop material will be fed into the top left corner of the bale case 3.

When operating, as the baler 1 moves along a windrow, the tines 14 of the pick-up mechanism 8 lift the crop material from the ground and convey it over the stripper plates 15 to deposit it on the feed platform 16. The sets of feeder tines 31, 32 and 33 and 73, 74 cooperate to sweep the crop material in successive steps across the feed platform 16 into the bale case 3. At the beginning of a feed cycle of the feed means 6, the set of feeder tines 31, 32 and 33 on the shaft 29 enters the feed chamber 5 for sweeping crop material collected on the end of the feed platform 16 remote from the bale case 3 over a predetermined length across the feed platform 16 in the direction of the bale case. This set of feeder tines 31, 32 and 33 adequately clears the corner of the feed chamber 5 remote from the bale case 3 of any accumulated crop material. Thereafter, this set of feeder tines 31, 32 and 33 retracts from the feed chamber 5 in an upward direction, while the set of feeder tines 31, 32 and 33 on the shaft 28 enters the feed chamber 5 in a downward direction. At this point, the adjacent sets of feeder tines 31, 32 and 33 on the shafts 28 and 29 overlap each other and are oriented generally perpendicular to each other so that the set of feeder tines on the shaft 28 combs off the set of feeder tines on the shaft 29 and takes over the crop material from the set of feeder tines on the shaft 29. This crop material, together with the crop material deposited directly on the feed platform 16 by the pick-up mechanism 8 at the location generally below the set of feeder tines on the shaft 28 is swept across the feed platform 16 in the direction toward the bale case 3. Meanwhile, the set of feeder tines on the shaft 29 continues rotating in the direction 37.

The set of feeder tines 31, 32 and 33 on the shaft 27 takes over crop material from the set of feeder tines 31, 32 and 33 on the shaft 28 and conveys it together with the crop material received directly on the feed platform 16 from the pick-up mechanism 8 in the direction towards the bale case 3. The set of feeder tines on the shaft 27 retracts in an upward direction from the feed chamber 5 after it has swept crop material across the feed platform 16 while the sets of feeder tines on the shafts 28 and 29 continue rotating in the direction 37.

Finally, the feeder tines 73, 74 alternately enter the feed chamber 5 and comb off the set of feeder tines 31, 32 and 33 on the shaft 27 as they retract from the feed chamber 5. At this point, the feeder tines 73, 74 are oriented generally perpendicular to the feeder tines 31, 32 and 33 on the shaft 27 as seen in FIG. 4. Upon continued rotation of the feeder tines 73, 74, they progressively move to a generally vertical position at the point where they move from the feed chamber 5 into the bale case 3, thus sweeping crop material from the feed chamber 5 into the bale case 3. As the feeder tines 73, 74 move through the bale case 3, they tilt over a fairly small angle beyond their vertical position, as seen in FIG. 9. In one adjustment position the angle of inclination of the feeder tines 73, 74 relative to the vertical at the point of retraction from the bale case 3 is in the range of 30°. Due to this rather small inclination together with the upward movement of the feeder tines 73, 74, crop material is forced into the upper left hand corner of the bale case 3 so that the bale case 3 is entirely filled at a substantially even density for obtaining properly shaped bales.

If the bales are not shaped properly, correction thereof may be obtained by adjusting the depth of penetration of the feeder tines 73, 74 into the bale case 3, and by adjusting the angle of inclination of the feeder tines 73, 74 relative to the vertical, in the manner as described above.

During operation of the feed means 6, crop material is pushed along the feed platform 16 in front of the feeder tines 73, 74 and draped therearound. Thus the feeder tines 73, 74 carry a folded charge of crop material into the bale case 3. In the formation of a bale, a plurality of these charges are fed into the bale case 3 and compressed by the plunger. On compression these charges become slices of the bale. For a properly shaped bale, these slices must be uniform in density across the bale case 3. This uniform density of the slices depends on the depth and the way that the feeder tines 73, 74 penetrate the bale case 3 and the way they retract therefrom, and also on the size of the slices. Usually, the more slices a bale comprises and the thinner these slices are, the easier it is to produce a properly shaped bale. For a large number of slices, more strokes of the feed means 6 and plunger are needed. With the feed means 6 according to the invention, it is possible to operate at a relatively high number of strokes per minute (for example, 120) without creating an unacceptable amount of vibration because the components of the feeder means 6 basically only make rotary movements and, therefore, the inertia forces caused by these components are relatively small. The reduced inertia forces reduce the wear on the components of the feeder means 6.

The sprockets 78, 82 and the chain 83 may be replaced by a gear train comprising a first gear keyed on the shaft 65, a second gear having twice as many teeth as the first gear keyed to the bushing 69 and a drive reversing gear therebetween.

The crank 67 and associated stub shaft 62 may be eliminated whereby the shaft 68 would be supported at only one end from the shaft 65 by the crank 66.

The arm 84, rod 85, stops 87, 88, coil spring 89 and support bracket 86 may by eliminated whereby the shaft 65 would be rigidly connected to the baler frame. Thereby, the shaft 65 would be truly stationary.

Figure 11:
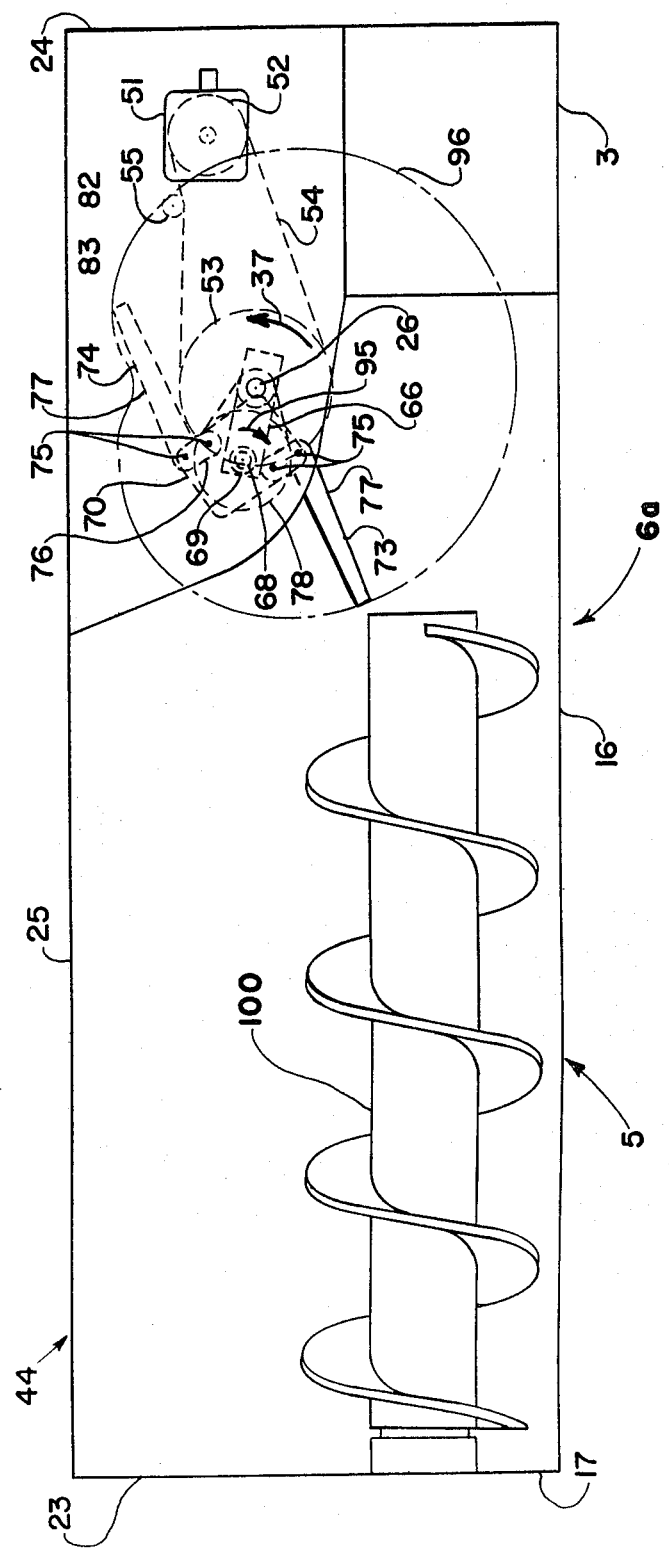
FIG. 11 is a view similar to FIG. 2 showing another embodiment of the feeder means.
Figure 12:
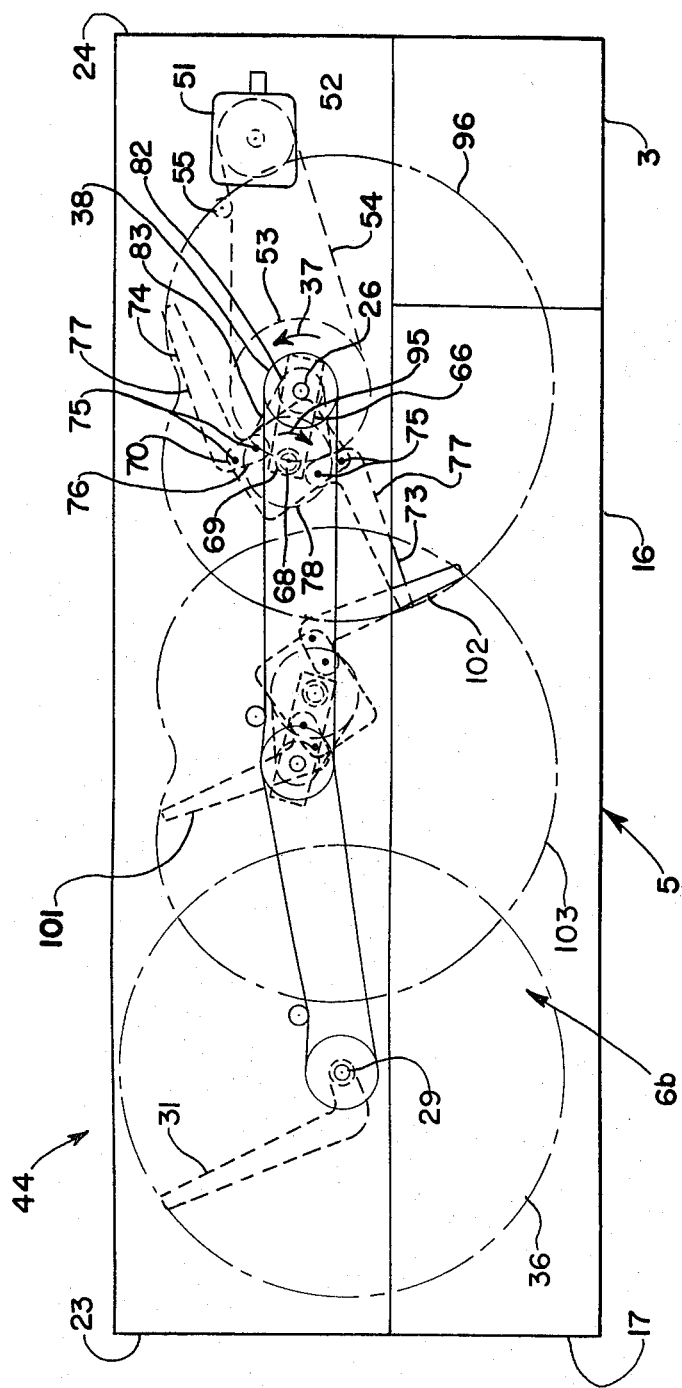
FIGS. 12 and 13 are views similar to FIG. 2 showing further embodiments of the feeder means.

The sets of feeder tines 31, 32 and 33 on the shafts 27, 28 and 29 may be replaced by any other suitable type of feeder mechanism. For example, in the embodiment shown in FIG. 11, the sets of feeder tines 31, 32 and 33 on the shafts 27, 28 and 29 have been replaced by a rotatable auger 100 which will move crop material across the feed platform 16 toward the bale case 3. The auger 100 cooperates with the feeder tines 73, 74 to constitute a modified feed means 6a. In the embodiment shown in FIG. 12, the sets of feeder tines 31, 32 and 33 on the shafts 27 and 28 have been replaced by pairs of feeder tines 101, 102 which are identical to the feeder tines 73, 74. The feeder tines 101, 102 are mounted in the same manner as the feeder tines 73, 74 for movement in the direction 37 in a path 103 which is similar to the path 96. The feeder tines 101, 102 together with the feeder tines 31, 32 and 33 on the shaft 29 and the feeder tines 73, 74 constitute another modified feed means 6b.

Figure 13:
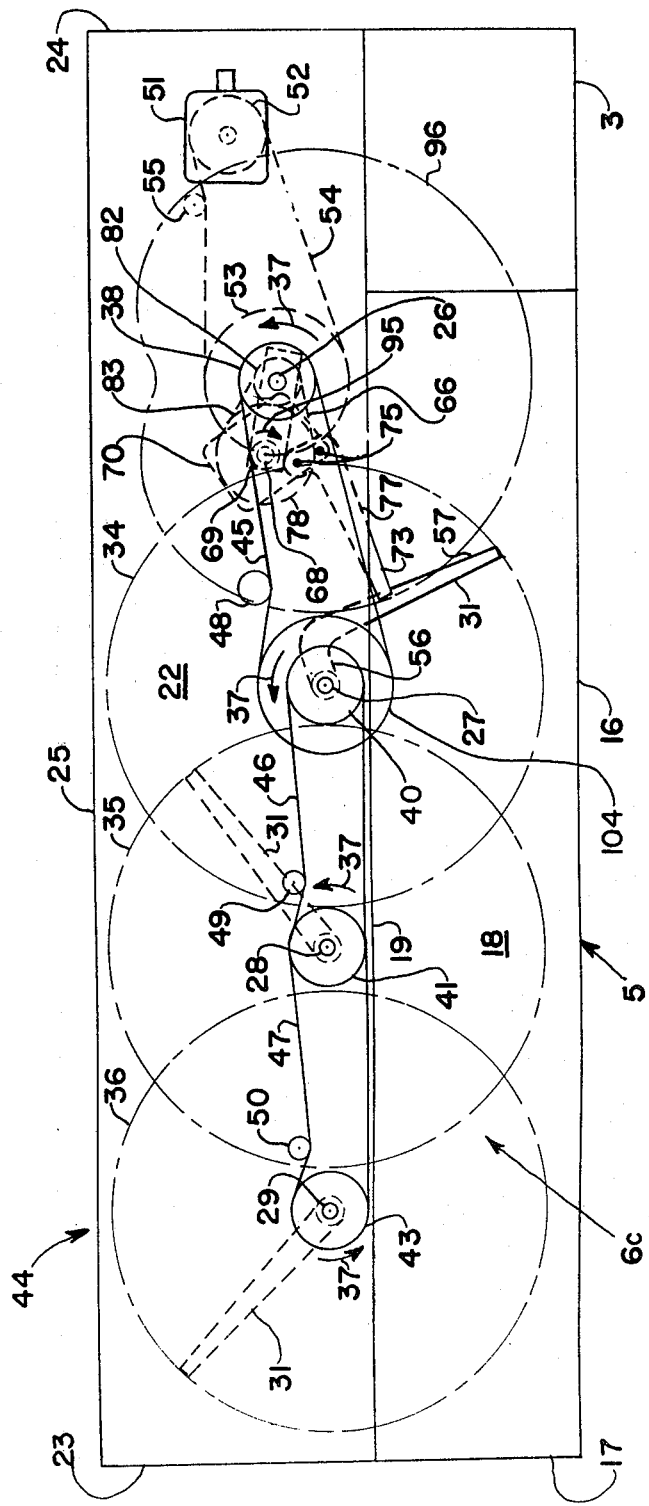

Referring to FIG. 13, the modified feed means 6c is identical to the feed means 6 shown in FIGS. 2-4 except that the feeder tines 74 have been removed and the sprocket 39 has been replaced with a larger sprocket 104. Preferably, the sprocket 104 has twice as many teeth as the sprocket 39 so that the sets of feeder tines 31, 32 and 33 on the shafts 27, 28 and 29 will be rotated at one-half the speed at which the remaining feeder tines 73 are rotated around the shaft 26. It will then be apparent that if the feed means 6c and the feed means 6 of FIGS. 2-4 are operated at the same number of strokes per minute, the feeder tines 73 of the feed means 6c will be rotated around the shaft 26 at twice the speed of the feeder tines 73, 74 of the feed means 6. Thus, due to their faster speed, the feeder tines 73 of the feed means 6c will remain in the bale case 3 a shorter time than the feeder tines 73, 74 of the feed means 6. This allows more variation in the timing between the feed means and the plunger when using the feed means 6c. Furthermore, due to their faster speed, the feeder tines 73 of the feed means 6c may be set to enter the bale case 3 at a later point, i.e. when the plunger is fully retracted past the bale case inlet opening 7. This reduces the tendency for the set of feeder tines on the shaft 27 to push crop material against the side of the plunger, particularly when the feed means 6c is operated at high speeds. The feeder tines 73 of the feed means 6c also reduce the loading on the set of feeder tines on the shaft 27 by combing them off at the faster speed.

The following claims are intended to cover all modifications and variations of the preferred embodiments of the invention without departing from the spirit and scope of the invention.

Having thus described the invention, what is claimed is:

1. In a baler including a bale case, a feed platform adjacent said bale case, feed means for feeding crop material across said feed platform into said bale case including feeder elements connected to and rotatable about a generally stationary means, the improvement comprising resilient means urging said generally stationary means in one direction while permitting movement of said generally stationary means in another direction in response to a predetermined load on said feeder elements.

2. The improvement defined in claim 1, wherein said feeder elements are rotatable around said generally stationary means in a substantially apple-shaped path.

3. The improvement defined in claim 1, wherein said generally stationary means comprises a shaft and said resilient means comprises a spring, and further comprising an arm connected at one end to said shaft, a rod connected to the other end of said arm, and said spring mounted on said rod urging said arm and said shaft in said one direction while permitting movement of said arm and said shaft in said another direction.

4. The improvement defined in claim 1, further comprising indicator means connected to said generally stationary means for indicating the amount of movement of said generally stationary means in said another direction.

5. The improvement defined in claim 3, further comprising an indicator arm connected to said shaft for indicating the amount of movement of said shaft in said another direction.

6. A baler comprising:
   (a) a bale case;
   (b) a feed platform adjacent said bale case;
   (c) feed means for feeding crop material across said feed platform into said bale case including feeder elements connected to and rotatable about a generally stationary means; and
   (d) resilient means urging said generally stationary means in one direction while permitting movement of said generally stationary means in another direction in response to a predetermined load on said feeder elements.

7. The baler defined in claim 6, further comprising indicator means connected to said generally stationary means for indicating the amount of movement of said generally stationary means in said another direction.

* * * * *